Jan. 27, 1953        L. E. TREAT        2,626,646
METHOD FOR PEELING VEGETABLES AND THE LIKE
Filed Oct. 29, 1949
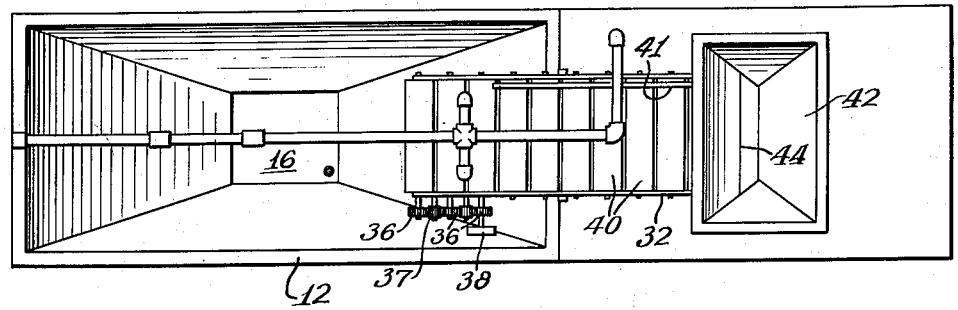
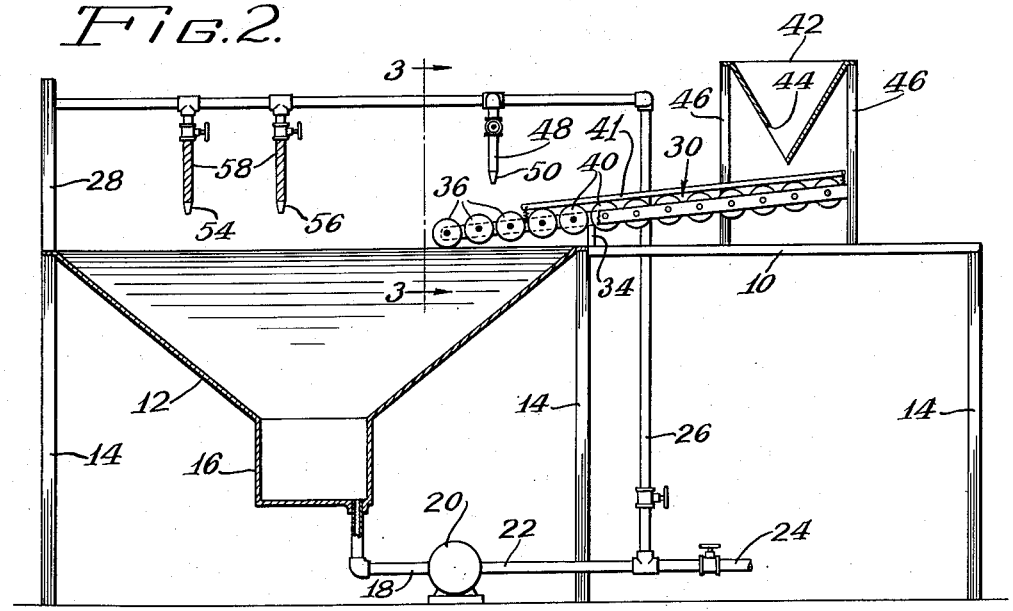
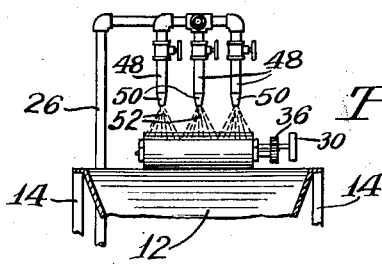
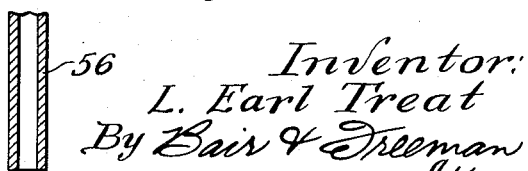
Inventor:
L. Earl Treat
By Bair & Freeman
Attys.

Patented Jan. 27, 1953

2,626,646

UNITED STATES PATENT OFFICE 2,626,646

METHOD FOR PEELING VEGETABLES AND THE LIKE

Leslie Earl Treat, Wilmette, Ill.

Application October 29, 1949, Serial No. 124,371

4 Claims. (Cl. 146—230)

This invention relates to a method for removing a surface layer from firm or rigid edible vegetable material such as potatoes, carrots, turnips and the like. The invention is particularly adapted for removing an outer skin or peel from such vegetable material.

According to the present invention, the above mentioned surface layer is removed by forcefully projecting against the edible vegetable material a suspension of a water soluble non-toxic crystalline material in a saturated aqueous solution of said crystalline material. The surface layer is then worn off by the impact of the suspended crystalline material. After removal of the surface layer, any crystalline material or solution thereof adhering to the vegetable material may be removed by rinsing with water.

By way of apparatus for practicing the above disclosed method, I have provided a device including a support for the vegetable material to be treated and preferably capable of advancing and rotating the same. One or more nozzles are provided for directing one or more jets of suspension against the vegetable material. The suspension may be pumped to the nozzles from a collecting sump located under the support. In the event that the flow effected by the pump is not sufficiently forceful, a compressed gas such as air may be admitted into the nozzles to cause forceful flow of suspension from the nozzles. If desired, a tank may be provided where the suspension is allowed to stand. On such standing, the suspended crystalline material will settle rapidly but not the vegetable particles worn off during the abrasive treatment. Thus, the supernatant suspension of vegetable material may be filtered to remove suspended vegetable material. The filtrate may be recombined with the settled crystalline material. By such treatment, the suspension of crystalline material may be rendered fit for repeated use after vegetable material has accumulated therein.

The above disclosed method involves abrasive removal of the surface layer, to any desired depth, and over all or any desired part of the surface area of a firm or rigid vegetable material. The disclosed invention differs radically from conventional abrasive methods using insoluble abrasive material such as sand or other forms of silica or the like. In any abrasive method of removing a surface layer involving the use of a finely divided abrasive material, some of the abrasive material tends to become embedded in the vegetable material which renders the vegetable material inedible. The non-toxic soluble abrasive material of my invention, on the other hand, may be permitted to remain in the vegetable material (with ultimate dissolution in the water content of the vegetable material) or, if desired, may be removed by simply washing the vegetable material with water.

Compared with non-abrasive methods of removing the surface layer of a firm or rigid vegetable material, my invention offers the advantage of effecting removal to any desired depth over any desired area with a minimum of waste of vegetable material.

It is therefore an important object of the present invention to provide method for peeling or removing a surface layer from vegetable material such as turnips, potatoes and carrots by abrasive impact against said material of a suspension of a water soluble non-toxic crystalline material in a saturated aqueous solution thereof.

Other and further objects and features of the present invention will become apparent from the following description and appended claims as illustrated by the accompanying drawings showing, by way of an example, apparatus for practicing the present invention. More particularly:

Figure 1 is a plan view of apparatus according to the present invention;

Figure 2 is a side view, with parts shown in vertical section, of the apparatus of Figure 1;

Figure 3 is a fragmentary cross-sectional view taken along the line 3—3 of Figure 2;

Figure 4 is an enlarged longitudinal cross-sectional view of one form of nozzle that may be included in the apparatus of Figures 1 to 3; and Figure 5 is an enlarged longitudinal cross-sectional view of another form of nozzle that may be included in the apparatus of Figures 1 to 3.

Referring now to Figures 1 to 3 the apparatus shown therein includes an elongated supporting table 10 and an elongated collecting sump 12 aligned therewith. Vertical legs 14 support the table 10 and sump 12. The latter is preferably formed with sloping walls and at its bottom with a well 16. Liquid collected in the well 16 is withdrawn through a conduit 18, a pump 20 and a conduit 22. The latter is formed with a first valved branch 24 (for discharging suspension to a settling tank not shown in the drawing) and with a second valved branch 26 which extends vertically through the table 10 and thereafter horizontally above the sump 12 parallel with the latter. The end of the branch conduit 26 is closed and is supported from the reservoir 12, as by means of a column 28. Nozzles are suspended from the upper horizontal part of the branch conduit 26, as will be described in greater detail hereinbelow.

The pumps 20 may be of any conventional construction for handling a suspension of crystalline material in a saturated aqueous solution thereof. Such pumps are available from a number of sources.

An inclined stationary roller conveyor generally indicated at 30 extends over the table 10 and projects above the adjacent part of the collecting sump 12. The conveyor includes two longitudinally extending bars 32 in which are journaled the shafts of the rollers. These bars may be supported by legs 34 at the end of the table. The last three rollers 36 above the sump 12 have their shafts projecting outside of bar 32 and are fitted with gears 36 meshing with intermediate idler gears 37. The shafts of one of these three rollers extends beyond its gear 36 and is fitted with a pulley 38 so that the three rollers 34 can be driven in unison in the same direction. The remaining rollers 40 are idlers. A bar 41 overlying the rollers 40 may be biased against the rollers 40 by springs to brake the rotation of the rollers to any desired extent. Above the other end of the conveyor 30 a hopper 42 having a bottom aperture 44 is supported by legs 46 which also serve to support this end of the conveyor 30. Thus, potatoes, carrots, turnips or like firm vegetable material may be placed in the hopper 42 for gradual discharge through the opening 44 onto the inclined conveyor 30. The inclination of the latter and the rotation of the rollers 36 will advance the vegetable material lengthwise of the apparatus to a point above the sump 12. The rollers 36 also rotate the vegetable material as it is being advanced.

Above the rollers 36, three branch pipes 48 extend from the conduit 26 (see Figure 3). Each of these three pipes 48 terminates in a nozzle 50 adapted to yield a fan-shaped flat jet indicated at 52. As shown, these nozzles are so arranged that their jets will lie in the same plane and will extend in parallelism with the rollers 36 so that each piece of vegetable advanced and rotated by the rollers 36 will be subjected to the action of the jets 52. It should be noted in this connection that as the rollers 36 advance the vegetable material and simultaneously rotate the same, each and every part of the surface of the vegetable material will be subjected to the action of the jets 52.

Beyond the rollers 36 and above the sump 12, nozzles 54 and 56 may be connected to the conduit 26 by flexible conduits 58.

The nozzles 50 and 54 may be of any suitable construction yielding a fan-shaped flat spray. By way of an example, I may use the nozzles shown in the patent to Dinley No. 2,116,863. The nozzle 56 may be a simple conduit of uniform cross-sectional area, as shown in Figure 4.

The nozzles 50 serve to bring about the removal of the surface layer from the vegetable material being treated without manual handling of the latter. Such removal may not be quite complete over all the areas of the material being treated. Further, the vegetable material may have defects or localized thickened skin areas that are not removed on exposure to the jets 52 from the nozzles 50. Such defects or localized thickened skin areas may be removed by grasping the vegetable manually as it passes beyond the jets 52 and thereafter trimming any desired areas by directing against such areas the jet from either one of the nozzles 54 and 56. Since the nozzle 54 yields a fan shaped flat jet while the nozzle 56 yields a generally circular jet, the operator has at her disposal two types of jets for selection according to the size and contour of the skin areas to be treated.

In the event that the force exerted by the pump 20 is not sufficient to yield the desired pressure at the nozzle 56, such force may be obtained by the use of compressed air in a nozzle such as the nozzle 60 shown in Figure 5 as including a passage 62 connected to a conduit 58 and discharging into a second offset passage 64 leading to a removable constricted tip 66 with which is aligned a conduit 68 for compressed air discharging into the passage 64.

While any non-toxic water soluble crystalline material may be suspended in a saturated aqueous solution thereof to form the suspension employed as disclosed in abrasive removal of surface layers from vegetable material, the preferred suspension is made up of ordinary salt suspended in a saturated salt solution or brine. Other operative compositions include potassium chloride, sodium sulfate, potassium sulfate, sodium acetate or the like non-toxic crystalline material suspended in saturated aqueous solutions thereof. The suspension may contain from 10 to 30% more of suspended crystalline material.

The pressure at the nozzles may be from 10 to 200 pounds per square inch. A pressure of from 60 to 90 pounds per square inch is preferred in peeling potatoes. From 1 to 5 seconds ordinarily suffice for removal of the skin of potatoes. Obviously, the time of exposure to the jet as well as the jet pressure may be varied depending on the desired depth of surface layer removal and the nature of the surface layer.

The fineness of the suspended crystalline material is preferably 40 mesh or less, say from 80 to 325 mesh, but may be varied to suit the particular conditions.

If desired, a germicidal agent may be incorporated with the suspension to keep the same more or less sterile. Such germicidal agents include, for instance, those shown in the patent to Domagk, No. 2,108,765.

Many changes in construction, composition and procedure may be made without departing from the principles of this invention. It is therefore not my purpose to limit the scope of the patent otherwise necessitated by the appended claims.

I claim as my invention:

1. The method of removing a surface layer from rigid vegetable material which comprises forcefully projecting against the surface of said vegetable material a suspension of a water soluble non-toxic crystalline material in a saturated aqueous solution of said crystalline material whereby said surface layer is worn off by the impact thereagainst of said suspended crystalline material.

2. The method of removing a surface layer from rigid vegetable material which comprises forcefully projecting against the surface of said vegetable material a suspension of a water soluble non-toxic crystalline material in a saturated aqueous solution of said crystalline material whereby said surface layer is worn off by the impact thereagainst of said suspended crystalline material and thereafter washing said vegetable material with water to remove residual crystalline material and adhering aqueous solution of said crystalline material.

3. The method of removing a surface layer from rigid vegetable material which comprises forcefully projecting against the surface of said vegetable material a suspension of sodium chloride in a saturated aqueous solution of sodium chloride whereby said surface layer is worn off by the impact thereagainst of said suspended sodium chloride.

4. The method of removing a surface layer from rigid vegetable material which comprises forcefully projecting against the surface of said vegetable material a suspension of sodium chloride in a saturated aqueous solution of sodium chloride whereby said surface layer is worn off by the impact thereagainst of said suspended sodium chloride, and thereafter washing said vegetable material with water to remove residual solid sodium chloride and adhering aqueous solution of sodium chloride.

L. EARL TREAT.

REFERENCES CITED

The following references are of record in the file of this patent:

UNITED STATES PATENTS

| Number | Name | Date |
| --- | --- | --- |
| 1,230,654 | Berry | June 19, 1917 |
| 1,389,796 | Thompson | Sept. 6, 1921 |
| 1,427,270 | Dunkley | Aug. 29, 1922 |
| 2,048,923 | Dodson | July 28, 1936 |
| 2,261,560 | Pellas et al. | Nov. 4, 1941 |